United States Patent [19]

De Niet

[11] 4,237,496

[45] Dec. 2, 1980

[54] DEVICE FOR CODING/DECODING DATA FOR A MEDIUM

[75] Inventor: Edmond De Niet, Eindhoven, Netherlands

[73] Assignee: U.S. Philips Corporation, New York, N.Y.

[21] Appl. No.: 5,883

[22] Filed: Jan. 23, 1979

[30] Foreign Application Priority Data

Jan. 30, 1978 [NL] Netherlands .................. 7801042

[51] Int. Cl.³ .............................................. G11B 5/09
[52] U.S. Cl. ..................................................... 360/40
[58] Field of Search ....................... 360/40, 44, 45, 51

[56] References Cited

U.S. PATENT DOCUMENTS

| | | | |
|---|---|---|---|
| 3,067,422 | 12/1962 | Hunt | 360/45 |
| 3,815,122 | 6/1974 | Schwartz et al. | 360/40 |
| 3,879,342 | 4/1975 | Patel | 360/45 |
| 3,959,816 | 5/1976 | Spiecens | 360/44 |
| 4,000,512 | 12/1976 | Lau | 360/44 |
| 4,032,979 | 6/1977 | Rice | 360/40 |

Primary Examiner—Vincent P. Canney
Attorney, Agent, or Firm—Thomas A. Briody; William J. Streeter; Edward W. Goodman

[57] ABSTRACT

In a coding device, a pseudo-ternary signal is derived from a binary data flow. Two of the three values of the latter signal represent the same data status. The three values of the pseudo-ternary signal determine the transition instant between the two values of the status quantity of the medium used. The transition instants are advanced and delayed, respectively, by said two values. The other signal value each time produces a nominal transition instant. A status transition then exists between every two successive bit cells. As a result of said mutual time shifts, a bipolar, phase-modulated signal with inserted pilot tone is generated. This signal, furthermore, does not contain a d.c. component and is suitable for saturation storage in a magnetic medium. The extraction of the data is realized by the formation of an exclusive-OR-function between the signal received and the output signal of a phase-locked loop which is cosynchronized by the signal received.

4 Claims, 9 Drawing Figures

| 24 | 0 | 0 | 1 | 1 | 1  | 0 | 1 | 0 | 1  | 1  | 0 |
| 25 | 0 | 0 | 1 | 0 | 1  | 1 | 0 | 0 | 1  | 0  | 0 |
| 26 | 0 | 0 | 1 | 1 | 0  | 1 | 1 | 1 | 0  | 0  | 0 |
| 29 | 0 | 0 | 0 | 0 | 1  | 1 | 0 | 1 | 1  | 1  | 0 |
| 28 | 0 | 0 | 1 | 1 | -1 | 0 | 1 | 0 | -1 | -1 | 0 |

DEVICE FOR CODING/DECODING DATA FOR A MEDIUM

BACKGROUND OF THE INVENTION

The invention relates to a device for introducing digital data into a medium by way of a status quantity thereof having at least two values, said device comprising a clock input for receiving a clock pulse series, a data input for receiving, in synchronism with the clock pulse series, a flow of data bits in a succession of bit cells, a sequentially operating logic circuit having means for being switched between at least three positions thereof, under the control of a data bit received, in order to generate per position a code bit, the first value of a data bit (1) alternatively corresponding to a first (+1) and a second (−1) value, respectively, of a code bit, the second value of a data bit (0) corresponding to the third value of a code bit (0), and to apply these code bits to the medium, by way of a code output device, in a self-synchronising series, at least substantially without d.c. component. The medium may be a magnetizable material which is driven along a read/write head device. Introduction thereby implies storage. Also, the medium may be a channel for data transmission. Introduction thereby means transmission. A code system of the described kind is known from a paper by P. J. van Gerwen, "On The Generation And Application Of Pseudo-Ternary Codes In Pulse Transmission", Phil. Res. Repts. 20 (1965), 469–484, notably FIGS. 7, 8, 9. Such a code without d.c. component is attractive when the transmission path to or the medium itself does not accept a d.c. component. This is the case, for example, for a transformer. A further advantage of said property consists in that a base line shift cannot have adverse effects on the accuracy during decoding. When a suitable digital filter is used, the known code has further zero points in the frequency response curve. The surroundings of one such zero point may be used for inserting a pilot frequency in the signal. A further advantage of the known device may consist in that no feed-forward is present, but feedback, so that an error will not be propagated in the flow of code bits. This property would decrease the sensitivity against interference or simplify the correction. The described code, uses three amplitude levels. In magnetic recording, this is a drawback because the intermediate level can never have magnetic saturation, so that the code is not self-erasing: an additional erase operation is thus required before introduction of new data. Moreover, the susceptibility to interference is reduced by the use of three different amplitude levels.

SUMMARY OF THE INVENTION

The invention has for its object to provide a coding device of the described kind in which the data are coded in a transition instant, while the advantageous properties of the known code are maintained. The objects in accordance with the invention are realized in that the code output device is suitable to impart each time, a first or a second value, and between successive bit cells each time, a different value of said status quantity to said medium, said code values being embodied in the transition instants of said status quantity in that the first, the second and the third code value drive an advanced, a delayed and a nominal transition instant, respectively. A circuit of this kind requires only few components. Moreover, the spectrum properties of the wave patterns are attractive and the code is self-erasing: the writing of new data does not require a separate erase operation. Moreover, the code results in a high data density, i.e. one bit per status transition. It is also to be noted that the circuit can implicitly receive the clock pulses, i.e. because the data received are already embodied in another, but also self-synchronising code. The clock pulse may be reconstructed by means of a known clock extractor.

Preferably, there is provided a clock pulse regenerator for forming, from the clock pulse series received, a first, a second and a third clock pulse series which are shifted with respect to each other each time over a time interval having a length which is smaller than one half bit cell, each of said clock pulse series thus formed being applied to a respective input element of a three-way switch, said input elements having a further input connected to a position indicating output of the sequentially operating logic circuit, so that each input element receives a signal from a respective one of said three positions in order to transmit the clock pulse signal applied thereto, and to introduce the status transition into the medium in synchronism with said clock pulse signal. This results in an attractive realisation of the idea of the invention, notably for comparatively low bit frequencies; the circuit, moreover, requires only few components.

Preferably, said sequentially operating logic circuit comprises a feedback line, having a delay time of at least two bit cell intervals, an output signal thereof being applied, together with the input data signal, to a gate circuit, an output of which feeds the delay circuit, the input signal and the output signal of the feedback line together forming a two bit code value. This results in a simple circuit. The decoding of the data elements, which produce two code bits values is also simple.

Preferably, said input elements are formed by logic gates which are all connected to the same data input whereby two gates are unlocked by said first data value, and the third gate is blocked, and vice versa and to unblock the third gate. This results in a high integrity against interference. Moreover, the said unblocking can change each time at the end of a bit cell, while the signal transitions occur in the middle of a bit cell. This gives proper separation in time between status transitions in the circuit which do and which do not cause a status transition in the medium.

Preferably, said time interval, representing the shift between the clock pulse series, lies between 1/10 and ¼ bit cell.

Preferably, there is provided a pulse width modulator having an input for receiving said code values and for generating, in reaction thereto, each time a pulse having one fixed edge and one variable edge the latter representing the code value, an output of the pulse width modulator being connected to the medium via a two-divider. This results in an attractive realization of the idea of the invention, notably for comparatively high bit frequencies. This circuit requires only few components.

The invention also relates to device for extracting digital data from a medium, for use with a device as described an output of the medium being coupled to an input of a phase-locked loop (PLL) for recovering a clock pulse series having half the bit cell frequency, an output of the phase-locked loop being applied, together with the output of the medium, to a modulo-2 adder. This results in a simple and reliable decoding device which may be used with a magnetizable layer as well as a data communication line as the medium, which is not affected by the method of forming the code elements.

DESCRIPTION OF THE DRAWINGS

The invention will be described in detail hereinafter with reference to the accompanying diagrammatic drawings.

DESCRIPTION OF THE PREFERRED EMBODIMENT

Figure 1A:
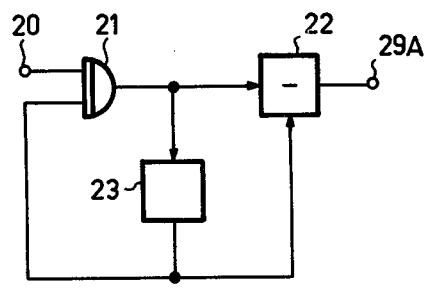
FIGS. 1a, 1b show two known coding devices.

FIG. 1a shows a first known device disclosed in the cited art. Element 21 is on exclusive-OR-gate or modulo-2 adder. The input 20 receives the data bits from a data source (not shown), for example, a computer. Any parallel/series converters, level restorers and the like have been omitted for the sake of simplicity. The data bits received are added modulo-2 to the bits delayed by a number of N bits cells in the element 23. In the element 22, the output signals of the elements 21 and 23 are subtracted from each other and the result is applied to the output 29A in the form of trivalent code elements. The foregoing is applicable to all values of N (2, 3 . . . ) and, in accordance with said article, also for the value $N=1$. The latter value cannot very advantageously be used according to the invention, as will be explained hereinafter.

Figure 1B:
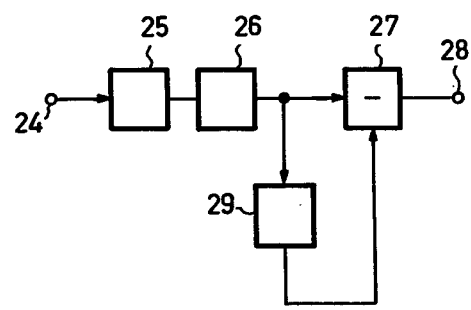
Figures 7, 8:
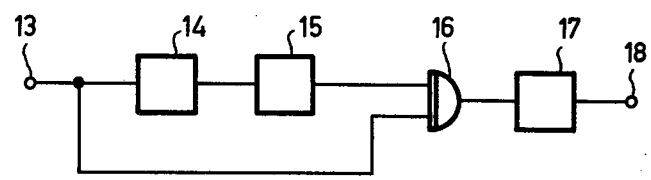
FIG. 7 shows a decoding device.
FIG. 8 shows a time sequence of binary signals.

FIG. 1b shows a second known device. The input 24 receives the data bits. Elements 25, 26 are status transition generators. Under the control of a bit of a first value, for example, a logic "1", on the input of such an element, a transition in the output data thereof occurs. Such a circuit can be realized by a combination of elements 21 and 23 of FIG. 1a, the latter element having a delay time corresponding to the length of one bit cell. The output of the exclusive-OR-gate constitutes the output of the circuit. After N transition generators, the signal is applied on the one hand to the delay element 29 and on the other hand to the subtractor 27. In delay element 29, the data are delayed by exactly N bit cells and are subsequently applied also to the subtractor 27. The output signal appears on the terminal 28. Permissible values of N are in this case powers of $2: N=1, 2, 4, 8, 16 \ldots$, the value $N=1$ again not being advantageous for the invention, as has been mentioned with respect to FIG. 1a. FIG. 8 shows a number of data values for $N=2$, the lines being numbered in accordance with the elements whose output they refer to; the lines 26 and 29, therefore, are identical except for a delay of two bit cells.

Figure 3:
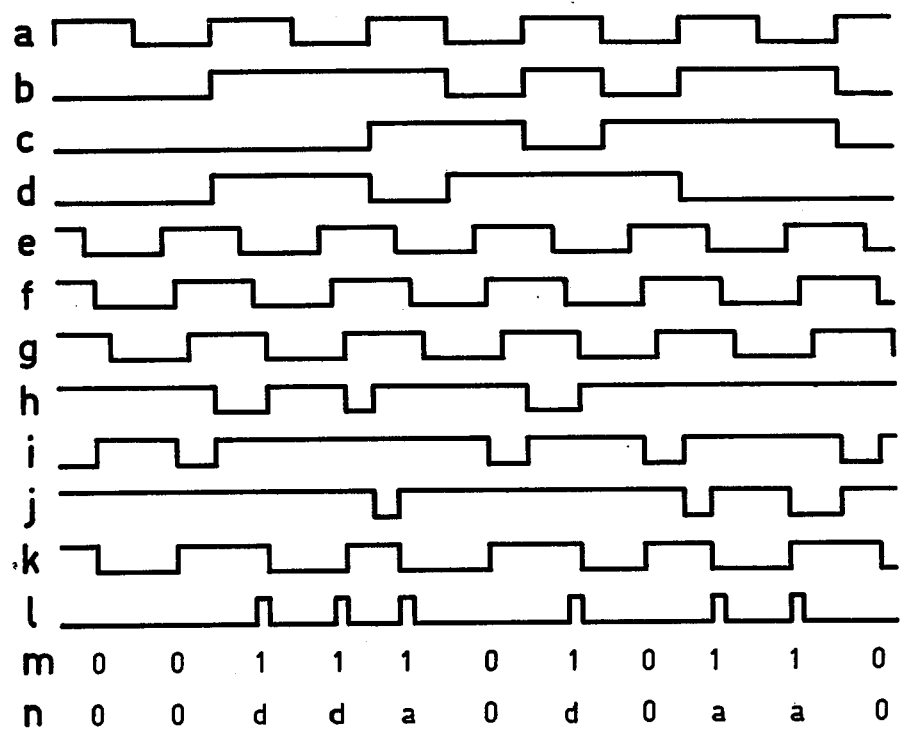
FIG. 3, consisting of a–n, shows some waveforms occurring in the arrangement of FIG. 2.
Figure 2:
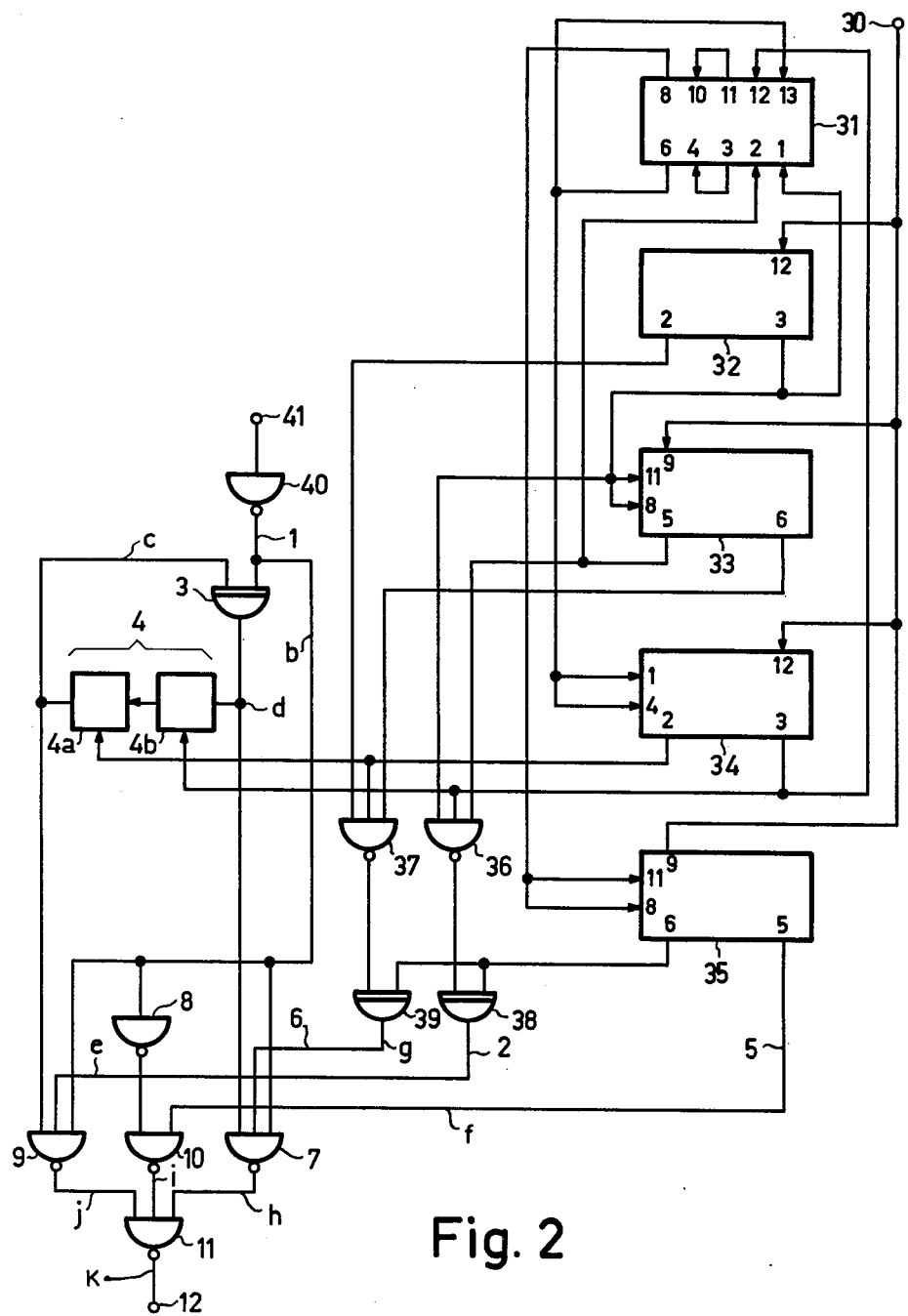
FIG. 2 shows a coding device in accordance with the invention.

FIG. 2 shows an embodiment of the invention, composed of digital components, for generating a signal in which the data are embodied in tristate phase modulations. The circuit comprises a data input 41, an inverter 40, an EXCLUSIVE-OR-gate 3, two series connected delay elements 4a, 4b, an inverter 8, four NAND-gates 7, 9, 10, 11, and a signal output 12. There is also provided a clock pulse system which comprises two NAND-gates 36, 37, two EXCLUSIVE-OR-gates 38, 39, and five function blocks 31–35 yet to be described. The operation of the circuit will be described with reference to FIG. 3 which shows several time diagrams of signals. The line a of FIG. 3 shows a succession of bit cells. Within a bit cell, data of the one or the other value can occur. The line b shows these data as a signal value, while the line m shows the bit values thereof. The data received are applied to EXCLUSIVE-OR-gate 3, the output signals of which are applied to the delay element 4. This element has a delay time which corresponds to the length of two bit cells. The output signal of the delay element 4 is shown on the line c, it being assumed that initially only "0" signals were present; this signal is also applied to the EXCLUSIVE-OR-gate 3. The output signal thereof is shown on line d. The signals on the lines d, c are applied to NAND-gates 7 and 9, respectively; the signal on the line b is also applied to an inverter 8 and next to NAND-gate 10, and furthermore, without inversion, to the NAND-gates 7, 9. On the line 2 a clock signal appears whose transitions are situated, in accordance with the line e, a predetermined time before the center of each bit cell of the line a. Similarly, on the line 5 a clock signal appears whose transitions are situated, in accordance with the line f, in the center of each bit cell of the line a. Similarly, on the line 6 a clock signal appears whose transitions are each time situated in accordance with the line g, slightly after the centers of each bit cell of the line a. The signals of the lines g, f and e are applied to NAND-gates 7, 10, 9, respectively. The NAND-gate 7 produces the signal on the line h which is thus formed from the signals on the lines b, d and g; in this respect, it is to be noted that possible "spikes" or "hazards" have been ignored; these are short disturbances in a logic signal which on a longer time scale are invalid and which may arise for example, because the input signals of a logic gate change in opposite directions approximately simultaneously. This situation occurs, for example, when the signal on line b becomes low for the first time (after the series of ones on the data input), at the instant at which the signal on the line d becomes high for the second time. If the former transition occurs slightly later than the latter transition, the signal on the line h could become low for a short interval. This effect may be avoided by giving gate 7 an adequate time constant, which is also applicable to the gates 9, 10 and 11. The magnitude of this time constant is determined by the tolerances between the instants at which the transitions occur and is in any case small with respect to the time-shifts between the respective clock pulse series. At a low bit rate, for example, in the range of between 10 and 100 kilobaud on the output 12, this will generally not impose any problems. Furthermore, additional steps against such "hazard" disturbances are known per se, for example, the use of additional logic gates which mask the effect of two opposed, simultaneously occurring transitions. The NAND-gate 10 similarly supplies a signal as shown on the line i, which is thus formed on the basis of the signals on the lines b and f. Similarly, the NAND-gate 9 supplies the signal shown on the line j which is formed on the basis of the signals on the lines b, c and e. Similarly, the NAND-gate 11 forms the signal shown on the line k from the signals on the lines h, i and j. The output signal of the NAND-gate 11 can be applied to the medium, for example, by way of a write amplifier or transmitter, not shown. The signal level itself is bivalent and the signal, therefore, is suitable for writing on a magnetic material by saturation storage. The data content in a signal transition are shown on the lines m, n: a signal transition contains the information "0" if it corresponds to a signal transition of the signal on the line f. If it corresponds to a signal transition of the signal on the line e, it is advanced (a): if it corresponds to a signal transition of the signal on the line g, it is delayed (d). In both latter cases, the data have the value "1". The device furthermore comprises a generator for generating a plurality of clock pulse series which are shifted with respect to each other. The terminal 30 can receive a master clock pulse series having a repetition frequency which is 8 times higher than the bit repetition frequency. These clock pulses are applied to a divider-by-sixteen which consists of the two-divider stages 32–35 of the commercial type 74107, the numbered connections thereof being used as indicated. Partial decoding of the positions of the flip-flops takes place in the element 31 of the commercial type 7400. This element comprises four dual-input NAND-gates and in this embodiment performs the function of two AND-gates. Output 5 of flipflop 35 supplies the "central" clock pulse signal of the line f in FIG. 3. The outputs 2 and 3 of the flipflop 34 alternately activate the delay elements 4a and 4b of the type 74164 which together constitute the two-bit delay element 4. Furthermore, the NAND-gates 36, 37 and the exclusive-OR-gates 38, 39 cooperate for decoding the indicated outputs of the flipflops 32–35, thus generating the advanced (e) and the delayed (g) clock pulse series, respectively. The inverter 40 inverts the input signals received on the input 41 and to restore these signals to the correct level, if necessary.

Figure 5:
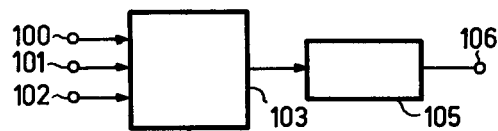
FIG. 5 shows a second coding device.
Figure 6:
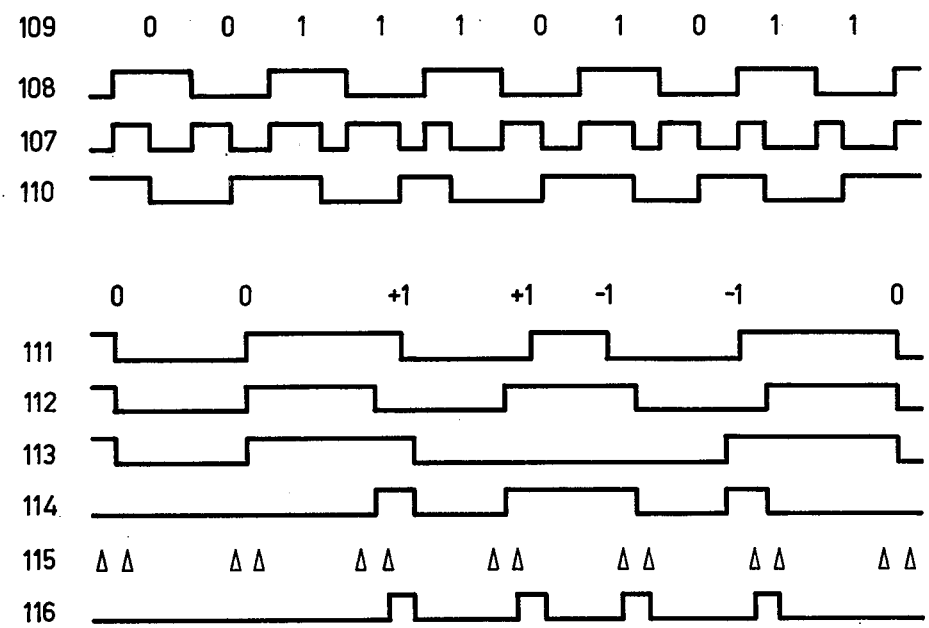
FIG. 6 shows some waveforms therein.

FIG. 5 shows a second coding device, particularly suitable for high bit frequencies, for example, in the range beyond 200 kilobaud. The device comprises a circuit (not shown) which corresponds to the part of FIG. 2 which generates the signals b, c and d, said signals arriving respectively on the inputs 100, 101, 102 of the pulse width modulator 103. On its input 104, the modulator 103 also receives a clock pulse having a clock pulse frequency of the same value as the bit frequency (thus, relatively much lower than in FIG. 2). In the pulse width modulator 103, these signals initiate delay times, one of the values of the signal b, for example "0," blocking the effect of the signals c and d, like in FIG. 2. The initiation of the delay time can be effected, for example, by the parallel loading of a relevant stage of a shift register or by way of a monostable multivibrator. FIG. 6 shows some waveforms in this respect. The line 107 shows the signal on the output of the pulse width modulator 103. The line 108 shows the clock signals. All edges of the clock pulse signal control the output signal of the element 103 to a high value; the drop to a low value takes place after the said, different delay times. The data, line 109, and the delays are assumed to be the same as in FIG. 3, lines m, n. The element 105 is a 2-divider which is activated only in reaction to the falling edges of the output signal of the modulator 103. The signal k of FIG. 3 is thus obtained again on the output of the element 105, see line 110 of FIG. 6.

FIG. 7 shows a decoding device for a signal as shown on the line k of FIG. 2. The terminal 13 can receive the self-synchronising data of the line k which are applied to the phase-locked loop (PLL) 14 of conventional construction. This loop comprises an output stage 15 which is constructed, for example, as a flipflop, and on the output of which a signal becomes available which corresponds to that of line f in FIG. 2. The loop 14 has a time constant which is large with respect to the length of a bit cell, for example eight times larger. The output signal of the stage 15 is applied, together with the input signal of the terminal 13, to exclusive OR-gate 16, so that the signal shown in FIG. 2, line 1 is formed. In the element 17, this signal is interrogated twice per bit cell, i.e. on both sides of the non-disturbed (symmetrical) clock pulse edge in order to enable detection of the centers of the advanced (a) as well as the delayed (d) signal peaks which represent a logic "1". This signal is stored in a data flipflop (not shown) which is activated by a clock signal which is derived in known manner from the signal of the phase-locked loop, for example, a higher harmonic thereof. Upon the next interrogation, after the received "1" pulse, said data flipflop assumes the zero position again. The falling edge of its output signal sets a next flipflop to the "1" position. The latter is reset exclusively by a clock signal which appears, for example, in synchronism with the transitions in the signal (a) of FIG. 3, i.e. the end of a bit cell. This 1–0 transition then always indicates, at a fixed time within a bit cell, whether the gate 16 supplied a "1" signal or a "0" signal. The described "spikes" thus represent little problem.

Figure 4:
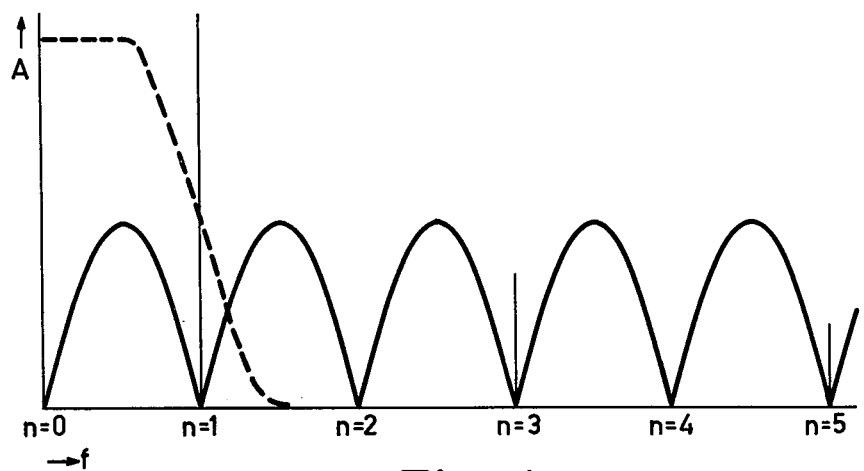
FIG. 4 shows a frequency response curve.

The invention can be adapted in various manners. In the circuit shown in FIG. 2, the modulation depth is determined by the shifting of the clock pulse series with respect to each other, said series being the same in this example and amounting to 1/16 of the entire clock pulse period ($\frac{1}{8}$ of a bit cell). This modulation depth may be different: in many cases, a shift of $\frac{1}{4}$ bit cell represents a suitable upper limit. Below 1/10 bit cell, the modulation depth is small (the modulation depth amounts to approximately 1/6 bit cell in FIG. 3). The shift may have a different value and may be realized, for example, by way of a delay line whereto the signal according to the line e of FIG. 3 is applied and wherefrom the signals according to the lines f and g are derived by way of suitable tappings. The lines 2 and 6 may be interchanged, so that the gate 7 receives an advanced clock pulse series and the gate 9 receives a delayed clock pulse series. In this respect, FIG. 4 shows a frequency response curve of the output signal: a zero point exists at a frequency zero (no d.c. current component) and furthermore each time at $f=n/(N.Tc)$; in this example $N=2$ and Tc is the length of a bit cell. At $n=1$, a pilot frequency (P) is added to the signal as a sharp line, said pilot frequency corresponding to the fundamental harmonic of the clock pulse series, the amplitude of said pilot frequency signal being quantitatively related to the modulation depth. As appears from the foregoing, no further steps are required for introducing this frequency in the signal. Also the odd higher harmonics ($n=3$, $n=5$, ...) of the clock pulse frequency occur at each time lower amplitudes; for example, that for $n=3$ is shown in the Figure. It will be clear that the value $N=2$ is very attractive in this case. For $N=1$, the pilot tone can be introduced only at the value of 1x the bit frequency, so that a larger bandwidth is required. For $N=>2$, on the one hand space also exists for a pilot tone at comparatively low frequencies. On the other hand, two zero points then occur in the frequency response in the region between $f=0$ and $f=1/T_c$. The tangent line thereto at $f=0$ will then be steeper, so that the share of very low frequencies is relatively increased. To a certain extent, this involves the same drawbacks as the frequency zero, so that the case where $N=2$ is usually to be preferred, without other values being precluded. A single sideband transmission system may be connected to the output 12 in FIG. 2, the lower sideband (between n=0 and n=1) of the pilot tone being attenuated only little, while the upper sideband (above n=1) is comparatively strongly attenuated, as indicated in FIG. 4 by an interrupted line. A known transmission characteristic formed by the transmission path and the post-equalization may be described, for example, by the Nyquist characteristic:

$A(u) = \frac{1}{2}\{1 - \sin \pi u/2wx\}$ for $|u| < wx$
$A = 0$ for $u > wx$, $A = 1$ for $-w1 < u < -wx$.

In this case, $wx/w1 = 0.5$ is chosen and $2\pi w1$ is chosen to correspond to the pilot frequency. This means in FIG. 4 that the sinusoidal curve is present in the segment between $n = \frac{1}{2}$ and $n = 3/2$. For a modulation depth of 0.2, a calculation has been performed for the generated tristate signals of line 111 in FIG. 6. The regenerated carrier is shown on line 112 and the tristate signal, after having passed through the filtering system and the regeneration amplifier, on the line 113. Line 114 shows the output signal of the exclusive-OR-gate (16 in FIG. 7). FIG. 6 clearly shows that the transitions at the information "0" have accurately retained their positions, but that the transitions for the information "1" have shifted. The line 115 shows the interrogation instants. The line 116 shows the data to be stored in a D-flipflop, said D-flipflop being provided with a "window," so that a logic "1" is stored for only a brief period of time. These data are processed again in the described manner. It has thus also been demonstrated that the disappearance of given pulse edges on the line 113 has no adverse effect on the reception of the data. It is important that the "0" edges maintain their position and they do so in the case of filtering according to a Nyquist characteristic up to a comparatively high modulation depth (approximately 25%).

In the foregoing, the invention has been described as an extension of the circuit shown in FIG. 1a. The circuit shown in FIG. 1b, being only a structural rather than a functional modification of the circuit shown in FIG. 1a in accordance with the specified literature, can also be used. N preferably has the value N=2 again, even though other values, such as N=1 or N=4, may be attractive in given situations. In FIG. 1b, the terminal 24 is used as the line 1 in the circuit shown in FIG. 2. The output of the element 26 is then connected to the input of the gate 7. The output of the element 29 is connected to the gate 9.

What is claimed is:

1. A device for introducing digital data into a medium by means of a bivalent status quantity thereof, said device comprising:
   (a) an input for receiving an interleaved data stream of even data bits and odd data bits;
   (b) clock pulse generating means for producing for each bit cell, in synchronism with the data bits received, at least one clock signal;
   (c) coding means for, within the stream of said even data bits, imparting, to a first value of a data bit a first value of a code bit signal and to a second value of a data bit an element of a first alternating succession of second and third values of a code bit signal, and, within the stream of said odd data bits, imparting to the first value of a data bit the first value of a code bit signal and to the second value of a data bit an element of a second succession of the second and third values of a code bit signal; and
   (d) output means, connected to an output of said clock pulse generating means, for each time generating, under control of a code bit signal, a transition in said status quantity, whereby under control of said first value of a code bit signal said transition occurs at a standard instant with a code bit cell, under control of said second value of a code bit signal said transition occurs at an advanced instant with respect to said standard instant, and under control of said third value of a code bit signal said transition occurs at a delayed instant with respect to said standard instant.

2. A device as claimed in claim 1, wherein said clock pulse generating means has three outputs for producing, for each data bit cell received at said input, a succession of a first, a second and a third clock signal for controlling in synchronism therewith said advanced, said standard and said delayed instants, respectively, and wherein said output means comprises three gates in parallel controlled by said three outputs, respectively, of said clock pulse generating means.

3. A device as claimed in claims 1 or 2, wherein the time shifts of said delayed and advanced instants with respect to said standard instant is betwen one-tenth and one-quarter of a bit cell.

4. A device for extracting digital data from a medium, for use in conjunction with a device as claimed in claims 1 or 2, wherein said extracting device comprises a phase-locked loop coupled to an output of the medium for recovering a clock pulse series having half the bit cell frequency, and a modulo-2 adder coupled to an output of said phase-locked loop and to said output of said medium.

* * * * *